United States Patent [19]

Sagane et al.

[11] 3,762,845

[45] Oct. 2, 1973

[54] APPARATUS FOR PRODUCTION OF FOAMED SHEET OF ETHYLENIC RESIN

[75] Inventors: Norio Sagane, Kyoto; Shinsaku Nakata, Toyonaka-shi; Hiroshi Ueda, Urawa-shi; Teiji Matumura, Minamisaitama-gun, all of Japan

[73] Assignee: Sekisui Kagaku Kogyo Kabushiki Kaisha, Kita-Ku, Osaka, Japan

[22] Filed: Oct. 7, 1971

[21] Appl. No.: 187,466

Related U.S. Application Data

[62] Division of Ser. No. 861,288, Sept. 26, 1969, Pat. No. 3,711,584.

[52] U.S. Cl. ............................ 425/4 C, 425/817 C
[51] Int. Cl. ............................................. B29d 27/00
[58] Field of Search ................. 425/4 C, 174.4, 404, 425/445, 817 C; 264/51, 53, 54, 93, 210, 288

[56] References Cited
UNITED STATES PATENTS

| | | | |
|---|---|---|---|
| 2,509,699 | 5/1950 | Sherrill | 425/445 X |
| 3,144,492 | 8/1964 | Lightner et al. | 264/53 X |
| 3,161,942 | 12/1964 | Cheney | 425/325 X |
| 3,584,108 | 6/1971 | Nelson et al. | 425/4 C X |
| 3,588,954 | 6/1971 | Nakamura et al. | 425/445 X |

Primary Examiner—R. Spencer Annear
Attorney—Edwin A. Shalloway

[57] ABSTRACT

Apparatus for producing a wrinkle-free, highly foamed sheet of an ethylenic resin having a uniform and fine cellular structure by causing a long strip of a sheet-like molded article of a cross-linked ethylenic resin containing a normally solid organic blowing agent to fall downwardly and continuously transferring it in the falling direction, heating the sheet-like molded article in transit to a foaming temperature, the heating being controlled so that a starting position of foaming along the width-wise direction of the sheet-like article will not appreciably fluctuate upwards or downwards, and extending the foamed sheet-like article in the width-wise direction.

5 Claims, 6 Drawing Figures

APPARATUS FOR PRODUCTION OF FOAMED SHEET OF ETHYLENIC RESIN

This application is a division of U.S. Pat. application Ser. No. 861,288, filed Sept. 26, 1969 now U.S. Pat. No. 3,711,584.

This invention relates to apparatus for the production of a foamed sheet of an ethylenic resin. More particularly, it realtes to apparatus for practicing a process for the production of a foamed sheet of an ethylenic resin, which comprises heating a flat or tubular sheet-like molded article of a cross-linked ethylenic resin containing a normally solid organic blowing agent to thereby foam the article.

It has heretofore been known to produce a foamed polyethylene sheet by applying ionizing radiation such as accelerated electrons to a polyethylene sheet containing a normally solid organic blowing agent or subjecting it to a cross-linking treatment with a cross-linking agent such as organic peroxides and heating the cross-linked polyethylene sheet to effect its foaming. Such cross-linking treatment causes the visco-elasticity of the polyethylene sheet during heating to be well balanced with its expansion by gases liberated on decomposition of the organic blowing agent, with the result that the polyethylene sheet is well foamed and not shrunken afterwards. Thus, a polyethylene sheet foamed to a high ratio can be obtained.

In the above-mentioned conventional manufacture of foamed sheets, the following three methods are mainly employed to foam the sheets by heating. One of the methods comprises placing an unfoamed sheet in a closed cavity mold, heating it and removing the foamed sheet by opening the mold. Because of the use of a mold, this method must be practiced batchwise, and the productive efficiencies become low. Other disadvantages are that the method cannot give a long strip of foamed sheet and the surface of the foamed sheet becomes roughened.

Another method of heat-foaming comprises heating an unfoamed sheet while transferring it on a belt conveyor. This method is advantageous in that a long strip of sheet can be obtained continuously. But it has the disadvantage that during the expansion of an unfoamed sheet, the sheet becomes tacky and adheres to the belt conveyor, and this prevents a free expansion of the sheet and results in foamed sheet products having a non-uniform thickness and many wrinkles. Furthermore, the surface condition of the obtained foamed product differs between top and bottom, and the commercial value of the products become lower.

The last of the three methods comprises supporting an unfoamed sheet afloat on a bath of liquid such as ethylene glycol heated to the foaming temperature and heating it from above by means of infrared rays and the like. This method is applicable where it is desired to obtain a long strip of foamed sheet continuously. Considerable difficulties are, however, encountered in transferring an unfoamed sheet afloat a liquid bath. A free three-dimensional expansion is incomplete, and the resulting foamed products have a non-uniform thickness and many wrinkles with the state of the surface being different between top and bottom. Also, there is a tendency that the foamed sheet is discolored by the deposition of the liquid, and therefore, it becomes necessary to provide a step of removing the liquid deposited on the foamed sheet.

In addition to these various defects of the conventional heat-foaming methods, the foamed sheets obtained by these methods have a non-uniform cellular structure in which large cells are present together with small ones; therefore, the foamed sheets have deteriorated physical properties such as heat-insulating properties and elasticity, and their commercial values are lowered.

One object of the present invention is to produce a foamed sheet of an ethylenic resin, which has a considerably uniform thickness and a smooth surface and is free from wrinkles.

Another object of the invention is to provide a foamed sheet of an ethylenic resin, which is foamed to a high ratio and has a very uniform and fine cellular structure.

Still another object of the invention is to produce a long strip of a foamed sheet of an ethylenic resin efficiently and continuously on an industrial scale.

Many other objects and advantages of the invention will become apparent from the following description.

The above-mentioned objects of the present invention can be achieved with apparatus for causing a long strip of a sheet-like molded article of a cross-linked ethylenic resin containing a normally solid organic blowing agent capable of liberating gases upon decomposition by heating to fall downwardly and continuously transferring it in the falling direction, heating the sheet-like molded article in transit to a temperature above the softening temperature of the cross-linked ethylenic resin and above the decomposition temperature of the organic blowing agent to thereby foam the sheet-like molded article, the heating being controlled so that a starting position of foaming along the widthwise direction of the sheet-like article will not appreciably fluctuate upwards or downwards, and extending the foamed sheet-like article in the widthwise direction by a ratio corresponding to expansion of the foamed sheet-like article in its widthwise direction to thereby remove wavy wrinkles occurring in the widthwise direction of the article at the time of foaming.

The most essential feature of the present invention is to cause the sheet-like molded article to fall downwardly and control the heating of the sheet-like molded article so that a starting position of foaming along the widthwise direction of the sheet-like article will not appreciably fluctuate upwards or downwards.

When a sheet-like molded article of an ethylenic resin is heat-foamed while it is falling downwardly, both surfaces of the sheet-like article are uniformly heated and foamed in an atmosphere of hot air without contacting the supporting device. Consequently, a three-dimensional free expansion of the sheet-like article is not hindered at all, and the surface of the foamed sheet-like article becomes smooth and beautiful by exposure to the hot air atmosphere. Furthermore, when the sheet-like material is heat-foamed while falling downwardly, the starting position of foaming which is situated along the widthwise direction of the sheet-like article fluctuates greatly upwards and downwards to cause non-uniformity in the thickness of the obtained foamed sheet-like article. If this position is rendered stationary as much as possible by controlling the heating, the resulting foamed sheet-like article comes to have a considerably uniform thickness.

Experiments have confirmed that if the starting position of foaming fluctuates within the distance of 30 cm upwards and downwards, the fluctuation in thickness of the obtained foamed sheet-like article is within about ±20 percent, and no problem arises in the use of the foamed sheet-like article for practical purposes. It has also been confirmed that if the heating temperature is controlled considerably accurately, the starting position of foaming can be fixed without any fluctuation perceptible with the naked eye, and accordingly, the thickness of the foamed sheet-like article can be made remarkably uniform.

Generally, when a sheet-like molded article of an ethylenic resin is heat-foamed while it is falling downwardly, it is likely to be elongated exceedingly and even to breakage. It has however, been found that if the sheet-like article is appropriately cross-linked, such excessive elongation or break does not occur, and the operation becomes easy.

We are the first to discover that when a sheet-like molded article of a cross-linked ethylenic resin containing an organic blowing agent is heat-foamed while it is falling downwardly, and at this time, the heating is controlled so that a starting position of foaming along the widthwise direction of the sheet-like article will not fluctuate upwards and downwards, there is obtained a foamed sheet-like molded article having a uniform thickness.

The heating temperature is preferably controlled by the provision of a pre-heating chamber and a foaming chamber each of which is equipped with radiation heaters such as infrared heaters. Hot air is introduced into the pre-heating chamber and the foaming chamber independently from each other. The sheet-like article is pre-heated in the pre-heating chamber to a temperature lower than the foaming temperature, and then the article, falling vertically in the heating chamber, is rapidly heated to the desired foaming temperature. The heating is further accurately controlled by radiation heaters, such as infrared heaters, to avoid the up-and-down fluctuation of the starting position as much as possible.

The so obtained foamed sheet-like molded article has wrinkles caused by expansion along the widthwise direction thereof. These wrinkles are removed in accordance with the invention by extending the width of the sheet-like article by a ratio corresponding to expansion in the widthwise direction. For effecting this widthwise extension, a cloth guider or stenter may be used when the foamed article is a flat sheet. But the side portions of the foamed sheet held by the cloth guider or stenter tend to be marred, and therefore must be trimmed. For this reason, it is preferable to use a pneumatic system utilizing a suction force of air in this extending process. The pneumatic system will be described later in the specification. If the obtained article is a tubular sheet, it can be extended by pressure of air introduced into the tubular sheet. But this method has the defect that it is not easy to keep the foamed tubular sheet dimensionally stable. It is preferable therefore to use a pneumatic system utilizing a mandrel which will be described later in the specification. It is to be noted that we are also the first to use such pneumatic systems for the above-mentioned purpose, and this is one of the essential features of the present invention.

When a foamed sheet-like molded article is extended in a widthwise direction in the present invention, it is transferred while containing roughly uniform wavy wrinkles, because the up-and-down fluctuations of the foaming start position along the widthwise direction of the sheet-like article are minimized as much as possible. Consequently, it is possible to effect the extending operation always under predetermined conditions, and to remove the widthwise, wavy wrinkles completely.

The foamed sheet which has been deprived of the wavy wrinkles by such extending operation is cooled by allowing it to stand at the temperature of the atmosphere, or is positively cooled, then taken up by a take-up device, and is generally wound up in a roll form. At this time, the take-up rate of the take-up device is generally the feed rate of the unfoamed sheet-like molded article plus a rate corresponding to the expansion of the sheet-like article in its longitudinal direction, or is slightly higher than this.

The cross-linked ethylenic resins containing the normally solid organic blowing agent capable of liberating gases on decomposition by heating are produced by the following two methods.

One of the methods comprises adding to an ethylenic resin an organic blowing agent having a decomposition temperature higher than the melting temperature of the resin, mixing them uniformly by means of such a device as ribbon blender and Banbury mixer, melting and kneading the resulting mixture by an extruder or a calender roll at a temperature at which the organic blowing agent is not substantially decomposed to thereby shape the mixture into a sheet form, and thereafter subjecting the sheet-like article to an ionizing radiation whereby the ethylenic resin that constitutes the sheet-like article is cross-linked. The other method comprises adding to an ethylenic resin an organic blowing agent having a decomposition temperature higher than the melting temperature of the resin and an organic peroxide having a decomposition temperature lower than the decomposition temperature of the organic blowing agent and a decomposition temperature higher than the melting temperature of said resin, mixing them uniformly by a ribbon blender or a Banbury mixer, melting and kneading the resulting mixture by an extruder or a calender roll at a temperature at which the organic peroxide is not substantially decomposed to thereby shape the mixture into a sheet form, and heating the sheet-like article to a temperature at which the organic peroxide is substantially decomposed and at which the organic blowing agent is not substantially decomposed whereby the ethylenic resin that constitutes the sheet-like article is cross-linked.

The ethylenic resin used in this specification includes homopolymers of ethylene such as low-density polyethylenes, medium-density polyethylenes and high-density polyethylenes and copolymers of ethylene such as an ethylene/vinyl acetate copolymer, an ethylene/propylene copolymer, an ethylene/butadiene copolymer, an ethylene/butene-1 copolymer and, ethylene/vinyl chloride copolymer. Preferable ethylenic resins have an average molecular weight of 10,000 to 100,000.

The kneading and melting temperature is slightly higher than the melting points of the ethylenic resins, and is usually 120° to 140° C. At these temperatures, the organic blowing agents and organic peroxides used in the present invention are not substantially decomposed.

The ethylenic resins used in the present invention may contain a rubbery substance such as natural rubber, butadiene rubber, isobutylene rubber, an acrylonitrile/butadiene copolymer rubber and a styrene/butadiene copolymer rubber. When such a rubbery substance is incorporated into the ethylenic resins, the tensile strength and elasticity of the resulting foamed sheet of the ethylinic resin are improved.

In view of the melting temperatures of the ethylenic resins, azodicarbonamide (decomposition temperature about 190° C.) N,N'-dinitrosopentamethylene tetramine(decomposition temperature about 204° C.) and p,p'-oxybis(benzenesulfonyl hydrazide) (decomposition temperature about 164° C.) are employed with good results as the normally solid organic blowing agents which liberate gases on decomposition by heating. The amounts of these blowing agents are determined depending upon a ratio of foaming of the intended foamed sheet. Roughly, the amounts of these blowing agents are one-half of the foaming ratio (expressed in parts by weight) per 100 parts by weight of the ethylenic resin. For example, if it is desired to obtain a foaming ratio of 30, the organic blowing agent is added in an amount of about 15 parts by weight per 100 parts by weight of the ethylenic resin. Among these organic blowing agents, azodicarbonamide is most preferable because it is rapidly decomposed without fear of coloration and explosion and moreover the kneading and melting temperatures of an ethylenic resin containing this blowing agent are well balanced with the foaming temperature thereof, and a foamed sheet with very fine cells is obtained.

When azodicarbonamide as the organic blowing agent and a metal salt of a fatty acid such as zinc stearate, calcium stearate, barium stearate, magnesium stearate, aluminium monostearate, aluminium distearate, aluminium palmitate and aluminium octoate are added to a powdery low-density polyethylene, the azodicarbonamide is well dispersed uniformly throughout the low-density polyethylene and is decomposed rapidly. As a result, a better foamed sheet is obtained from this combination. Preferably, the amounts of the fatty acid metal salts are 0.5 to 3 parts by weight based on 100 parts by weight of the low-density polyethylene.

The ionizing radiation rays to be used in cross-linking the ethylenic resins are $\beta$ rays, $\gamma$ rays, neutron and electron. When a sheet-like molded article of an ethylenic resin is subjected to ionizing radiation, a cross-linkage occurs among the molecules of the ethylenic resin. This brings about a rise in the softening temperature of the resin, and makes its viscosity properties suitable for expansion thereof by heating.

If the dose of these ionizing radiation is less than 0.5 Mrad, the obtained multicellular product has low ratio of foaming and nonuniform cells. Moreover, when the unfoamed sheet-like material is transferred by falling at the time of heat-foaming, the sheet-like material is remarkably elongated because of its own weight, thus maing it impossible to foam the sheet-like material well. If, on the other hand, the dose is above 20 Mrad, the degree of cross-linkage becomes excessive and the sheet-like material is not well foamed. For this reason, the dose of the ionizing radiation is preferably in the range of 0.5 to 20 Mrad. In the present invention, the use of electron rays as the ionizing radiation is preferable from the industrial viewpoint. For obtaining a uniform irradiation, it is preferable to irradiate electron rays of the same dose onto the top and the bottom surfaces of the sheet-like molded article.

When the organic peroxides are used to cross-link the ethylenic resins, such compounds as dicumyl peroxide (decomposition temperature about 160° C.), 2,5-dimethyl-2,5-di(tertiary-peroxy)-hexane (decomposition temperature about 157° C.) and di-tertiary-butyl-perterephthalate (decomposition temperature about 144° C.) are used with good results. Desirable organic peroxides have a decomposition temperature at least about 20° C. lower than the decomposition temperature of the organic blowing agent. Best results are obtained with a combination of azodicarbonamide as the organic blowing agent and dicumyl peroxide as the organic peroxide.

Heat decomposition of the organic peroxides yields free radicals, and results in the formation of a cross-linkage among the molecules of the ethylenic resin that makes up the sheet-like molded article. Preferably, the amounts of the organic peroxides are such that the gel fraction of the cross-linked ethylenic resin in hot xylene is 30 – 45 percent by weight.

If a mixture of the ethylenic resin and the organic blowing agent or a mixture of the ethylenic resin, the organic blowing agent and the organic peroxide is kneaded and melted and shaped into a sheet form after removing the air present inside the mixture as much as possible, the cells of the resulting foamed sheet become exceedingly uniform and fine. When a sheet-like molded article containing air is foamed by heating, the obtained foamed sheet contains both large cells caused by expansion of the air and smaller cells caused by the decomposition gases of the organic blowing agent. If, however, the sheet-like molded article is heat-foamed after removing air present therein as much as possible, there is hardly any influence of the air, and a foamed sheet having exceedingly uniform and fine cells can be obtained.

Again, we are the first to apply to the manufacture of a foamed sheet, with good results, a technique of kneading and extruding such a mixture after having removed the air present therein as much as possible, and this constitutes another essential feature of the present invention.

For realizing this, usually employed are a method comprising feeding the mixture into a vacuum hopper provided at a feed stock inlet of a screw-type extruder to suck and remove the air inside the mixture, and extruding it into a sheet form while kneading and melting it in the extruder, and a method comprising sucking and removing the air present in the mixture from a vent provided in an extruder of the screw type and concurrently kneading and melting the mixture and extruding it into a sheet form. The former method is particularly preferred in respect of operation and effect.

Extruders provided with a vacuum hopper or a vent are known to those skilled in the art, and do not appear to need description.

Our experiments have indicated that when a mixture consisting of 100 parts by weight of a powdered polyethylene having a melt index of 4.0 and a specific gravity of 0.922 (passable through a 10-mesh screen) and 10 parts by weight of azodicarbonamide is kneaded and melted at 135° C. by an extruder without removing the air present in the mixture and then extruded into a sheet form, a sheet having a specific gravity of 0.82 is obtained; and that when the obtained sheet is subjected to the irradiation of 3 Mrad electron rays and heat-foamed at 200° C., it is expanded to about 20 times and there is obtained a foamed sheet having cells with a diameter of about 0.5 mm. On the other hand, we have found that when an extruder provided with a vacuum hopper is used and after removing the air inside the mixture by reducing the pressure of the vacuum hopper to 350 mmHg, 450 mmHg and 540 mmHg respectively below the atmospheric pressure to discharge air from the mixture, the mixture is kneaded and melted at 135° C. by means of the extruder and then shaped, there is obtained a sheet having a specific gravity of 0.86, 0.90 and 0.93 respectively; and that when this sheet is subjected to the irradiation of electron rays of 3 Mrad and heated to 200° C. in accordance with the process of the present invention, it is expanded to about 20 times and there is obtained a sheet having cells with a diameter of about 0.3 mm, 0.2 mm and 0.1 mm respectively.

It is clear from these experiments that if air inside the mixture is discharged as much as possible, it is possible to reduce the sizes of cells of the obtained foamed sheet to a remarkable degree.

Specific embodiments of this invention have been chosen for purposes of illustration and description, and are shown in the accompanying drawings, forming a part of the specification, wherein.

Figure 1:
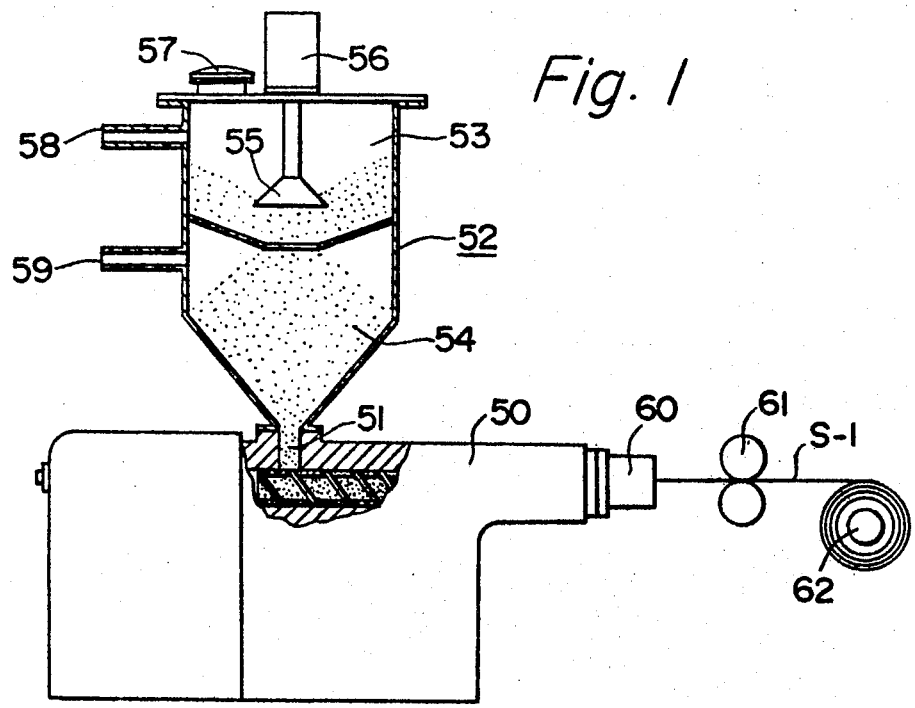
FIG. 1 is a schematic view of the apparatus for producing the sheet of the invention.

Referring to FIG. 1, a screw type extruder, shown at 50, is provided with a vacuum hopper 52 at its stock feed inlet 51. The vacuum hopper 52 is divided into a first chamber 53 and a second chamber 54, with a valve 55 used for partitioning. The valve 55 is moved up and down by means of an air cylinder 56 for closing and opening of the two chambers 53 and 54. The vacuum hopper 52 also includes a material throwing opening 57, a suction pipe 58 for reducing the pressure in the first chamber 53, and a suction pipe 59 for reducing the pressure in the second chamber 54. A T-die 60 is fitted to the top of the extruder 50. Reference numeral 61 shows a take-up device consisting of a pair of pinch rolls, and 62, a wind-up device.

Figure 2:
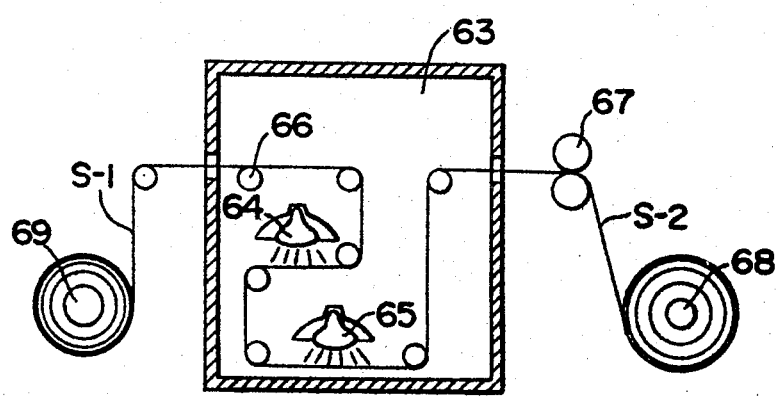
FIG. 2 is a schematic view of the apparatus for irradiating accelerated electrons to the sheet in accordance with the invention.

Referring to FIG. 2, the reference numeral 63 indicates a chamber for irradiating accelerated electrons, which includes accelerated electron generators 64 and 65. Reference numeral 66 indicates a guide roll, 67, a take-up device consisting of a pair of pinch rolls, 68, a wind-up device, and 69, a delivering device.

Figure 3:
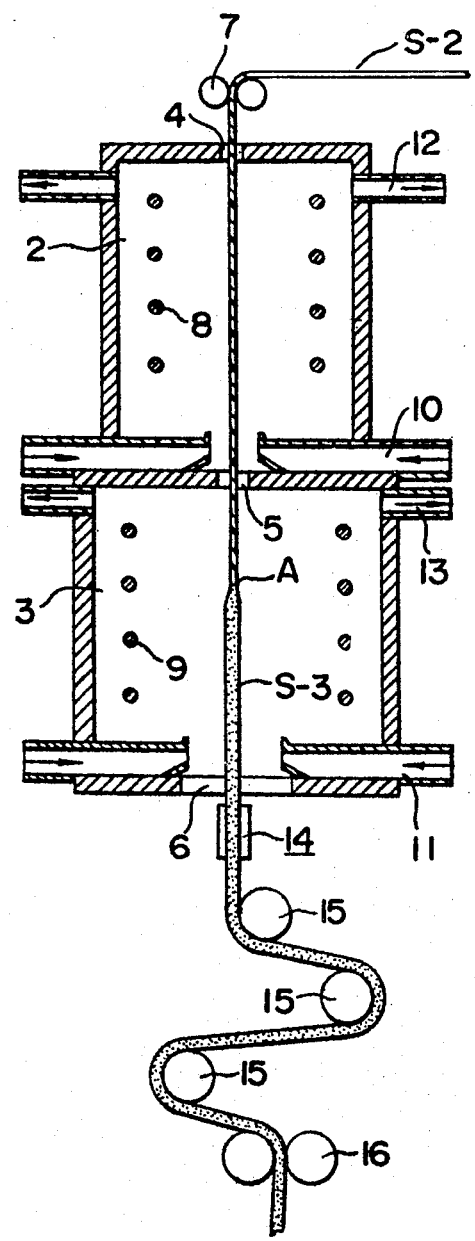
FIG. 3 is a sectional view, partly broken away, of an apparatus for foaming a flat sheet.

In FIG. 3, a pre-heating chamber is shown at 2, and a foaming chamber 3 is disposed below pre-heating chamber 2. Both the preheating chamber 2 and the foaming chamber 3 are constructed with heat-insulating walls. An upper wall of the pre-heating chamber 2, the boundary wall between the pre-heating chamber 2 and the foaming chamber 3, and a lower wall of the foaming chamber 3 contain apertures 4, 5 and 6, respectively, for passage of a sheet. Above the aperture 4 of the pre-heating chamber 2 is located a supporting device 7 for the sheet. The supporting device 7 consists of a pair of pinch rolls for delivery of the sheet so that the sheet is transferred into the preheating chamber 2 while being supported by this pair of pinch rolls. A number of infrared heaters 8 and 9 are disposed in the pre-heating chamber 2 and the foaming chamber 3, in parallel with the widthwise direction of the sheet and at certain intervals on both sides of the sheet in a symmetrical manner. Hot air inlets 10 and 11 are provided at the lower portions respectively of the pre-heating chamber 2 and the foaming chamber 3, and hot air outlets 12 and 13 are provided at the upper portions respectively of the pre-heating chamber 2 and the foaming chamber 3. Hot air introduced into the pre-heating chamber 2 and the foaming chamber 3 from the hot air inlets 10 and 11 respectively rises along both surfaces of the sheet and is exhausted outwards from the hot air outlets 12 and 13.

By partitioning the pre-heating chamber 2 from the foaming chamber 3 by the boundary wall, the temperature of the pre-heating chamber 2 and the foaming chamber 3 can be controlled independently.

The reference numeral 14 indicates a sheet extending device, 15, a group of cooling rolls, and 16, a take-up device consisting of a pair of sheet take-up rolls. This pair of pinch rolls 16 are adapted to be rotated at the feed rate of the unfoamed sheet-like molded article plus a rate corresponding to the expansion of the sheet-like article in its longitudinal direction, or at a rate slightly higher than this.

Figure 4:
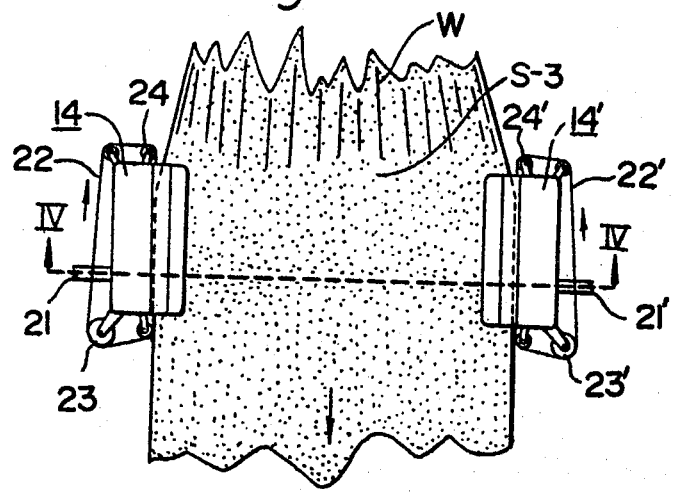
FIG. 4 is an enlarged side elevation, partly broken away, of the extended part of the sheet shown in FIG. 3.
Figure 5:
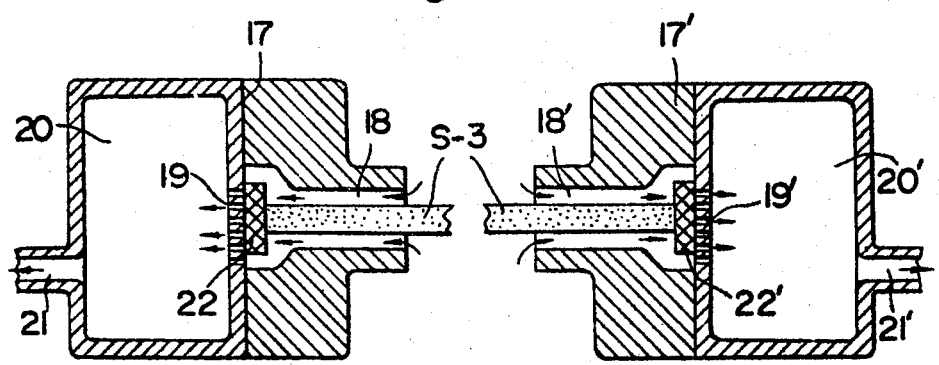
FIG. 5 is a partly-broken-away, enlarged sectional view taken along the line IV—IV of FIG. 4; and, FIG. 6 is a perspective view, partly broken away, of an apparatus for foaming a tubular sheet.

The details of the sheet extending device 14 are shown in FIGS. 4 and 5. In FIGS. 4 and 5, the reference numerals 14 and 14' indicate two extending devices of the same construction. These are opposed to each other in a symmetrical fashion by a distance corresponding to the width of the expanded sheet. The reference numerals 17 and 17' indicate suction devices, and the sheet guide grooves 18 and 18' are each provided between facing surfaces of each suction device 17 or 17'. The bottoms of each of guide grooves 18 and 18' have a number of suction holes 19 and 19' which lead respectively to pressure reducing chambers 20 and 20' respectively provided inside the suction devices 17 and 17'. The suction holes 19 and 19' are designed to suck the outer air with vigor by discharging air inside the pressure reducing chambers 20 and 20' from exhaust pipe 21 and 21' by means of a vacuum pump (not shown).

The gap of each of guide grooves 18 and 18' is determined according to the thickness of a sheet to be tentered, generally about 1.5 to three times the thickness of the sheet.

Moving belts 22 and 22' having a number of air vents are provided on the bottom surfaces of the sheet guide grooves 18 and 18' so that they can slide over the bottom surfaces in intimate contact. The moving belts 22 and 22' are mounted on drive rollers 23 and 23' and guide rollers 24 and 24', and are adapted to be moved by the drive rollers 23 and 23' at the same velocity as the sheet take-up velocity. The moving belts 22 and 22' may be a cloth or a rubber belt provided with a number of small apertures.

An embodiment of foaming a flat sheet by means of the apparatus shown in FIGS. 1 to 5 will be described below.

One hundred parts by weight of a powdered polyethylene (passable through a 10-mesh screen) having a melt index of 4.0 and a specific gravity of 0.922, 15 parts by weight of azodicarbonamide and two parts by weight of zinc stearate are mixed in a ribbon blender for 20 minutes at room temperature. The resulting mixture is put into the second chamber 54 from the material throw-in opening 57 of the vacuum hopper 52 to about half of its height. The air cylinder 56 is then actuated to close the second chamber 54 by means of the valve 55. Further, the mixture is put into the first chamber 53 to about half of its height. The throw-in opening 57 is then closed, and the pressures of the first chamber 53 and the second chamber 54 are reduced by means of the suction pipes 58 and 59 to 550 mmHg below the atmospheric pressure, whereby the air contained in the mixture is discharged. With the valve 55 being opened, the mixture in the second chamber 54 is fed into the stock feed inlet 51 of the extruder 50. When there is no mixture in the first chamber 53, the valve 55 is closed and the mixture is put into the first chamber 53. The pressure of the first chamber 53 is then reduced to 550 mmHg below the atmospheric pressure. The mixture is kneaded and melted in the extruder at a temperature of about 135° C., and extruded into a flat sheet form from a T-die 60. The sheet is taken up by the take-up device 61 consisting of a pair of pinch rolls to obtain a flat sheet S-1 containing the foaming agent and having a thickness of 2.2 mm and a width of 400 mm, which is then wound up onto the wind-up device 62.

The obtained flat sheet S-1 is mounted on the delivery device 69 shown in FIG. 2, and exposed to the irradiation of a total dose of 3 Mrad of accelerated electrons both at the top and bottom surfaces thereof by means of the accelerated electron generators 64 and 65 in the accelerated electron irradiation chamber 63. This procedure gives a cross-linked flat sheet S-2, which is then taken up by a take-up device 67 consisting of a pair of pinch rolls and wound up with a wind-up device 68.

The so obtained polyethylene flat sheet S-2 having a thickness of 2.2 mm and a width of 400 mm is passed through the aperture 4 while being supported by the supporting device 7 consisting of a pair of pinch rolls rotating at a surface speed of 2 meters/min. in the apparatus of FIG. 3, to cause it to fall vertically into the pre-heating chamber 2 maintained at a temperature of about 200° C. The flat sheet S-2 is preheated there to about 160° C., and passed through the aperture 5 to cause it to fall vertically into the foaming chamber 3 maintained at a temperature of about 280° C. In the foaming chamber 3, the flat sheet S-2 is heated to about 200° C. Since the polyethylene resin that constitutes the flat sheet S-2 is cross-linked, the sheet is not elongated excessively or to breakage by its own weight even when heated to a temperature in the range of about 160° to 200° C. in the pre-heating chamber 2 and the foaming chamber 3. The temperature of the flat sheet S-2 heated to about 200° C. in the foaming chamber 3 is then accurately controlled in its widthwise direction by the infrared heaters 9 disposed in the foaming chamber 3. By this accurate temperature control by the infrared heaters 9, a starting position of foaming of the flat sheet S-2 is substantially constant on a line along the widthwise direction thereof and hardly fluctuates upwards or downwards. The flat sheet S-2 is thus rapidly and sharply expanded three-dimensionally to about 30 times on line A along the widthwise direction thereof. At this time, wavy wrinkles W occur in the widthwise direction in the flat sheet S-3 owing to the rapid expansion. These wrinkles hardly change in their wavy configuration since the starting position of foaming does not fluctuate upwards or downwards as mentioned above. Thus, the subsequent extending operation will be very easily carried out.

The foamed flat sheet S-3 is passed through the aperture 6 from the foaming chamber 3, and stretched in the widthwise direction by means of the extending device 14 by a ratio corresponding to expansion of the flat sheet S-2, that is, to a final width of 1,200 mm. Consequently, the wrinkles occurring in the foaming operation are completely removed.

The extending of the foamed flat sheet S-3 by the tentering device 14 will be described in detail with reference to FIGS. 4 and 5.

The distance between the extending devices 14 and 14' is adjusted to correspond to a ratio of widthwise direction of the flat sheet S-2, that is, 1,200 mm in this case. Both sides of the vertically moving foamed flat sheet S-3 are inserted into the guide grooves 18 and 18' of the suction devices 17 and 17'. When the air inside the pressure reducing chambers 20 and 20' is discharged from the exhaust pipes 21 and 21' by means of a vacuum pump, the outer air passes through a gap between the inner wall surfaces of the guide grooves 18 and 18' and both surfaces of the foamed flat sheet S-3, through the suction holes 19 and 19' at the bottom surfaces of the guide grooves 18 and 18', and is sucked into the pressure reducing chambers 20 and 20'. As a result, the sheet guide grooves 18 and 18' are maintained at reduced pressure, and both side surfaces of the foamed flat sheet S-3 are sucked to the moving belts 22 and 22' sliding in intimate contact with the bottom surfaces of the guide grooves 18 and 18'. In this state, the flat sheet S-3 is transferred in the moving direction of the belts 22 and 22'. The moving speeds of the moving belts 22 and 22' are made the same as the speed of pulling the flat sheet S-3. The flat sheet S-3 is then cooled by the cooling rolls 15, and taken up by a take-up device 16 consisting of a pair of pinch rolls rotating at a surface speed of 3 meters/min. Since the flat sheet S-3 has been considerably cooled by the outer air after leaving the foaming chamber 3, the surface of the flat sheet S-3 is not marred when contacted with the surfaces of the cooling rolls 15.

The so obtained foamed flat sheet S-3, 5 mm thick and 1,200 mm wide, has a uniform and fine cellular structure with a beautiful, smooth surface in which a ratio of expansion is about 30, and the cells have a diameter of about 0.1 mm. Also, the obtained foamed flat sheet has a uniform thickness and is free from wrinkles.

As another preferred embodiment, the foaming of a tubular sheet by means of the apparatus of FIG. 6 will be described below.

Figure 6:
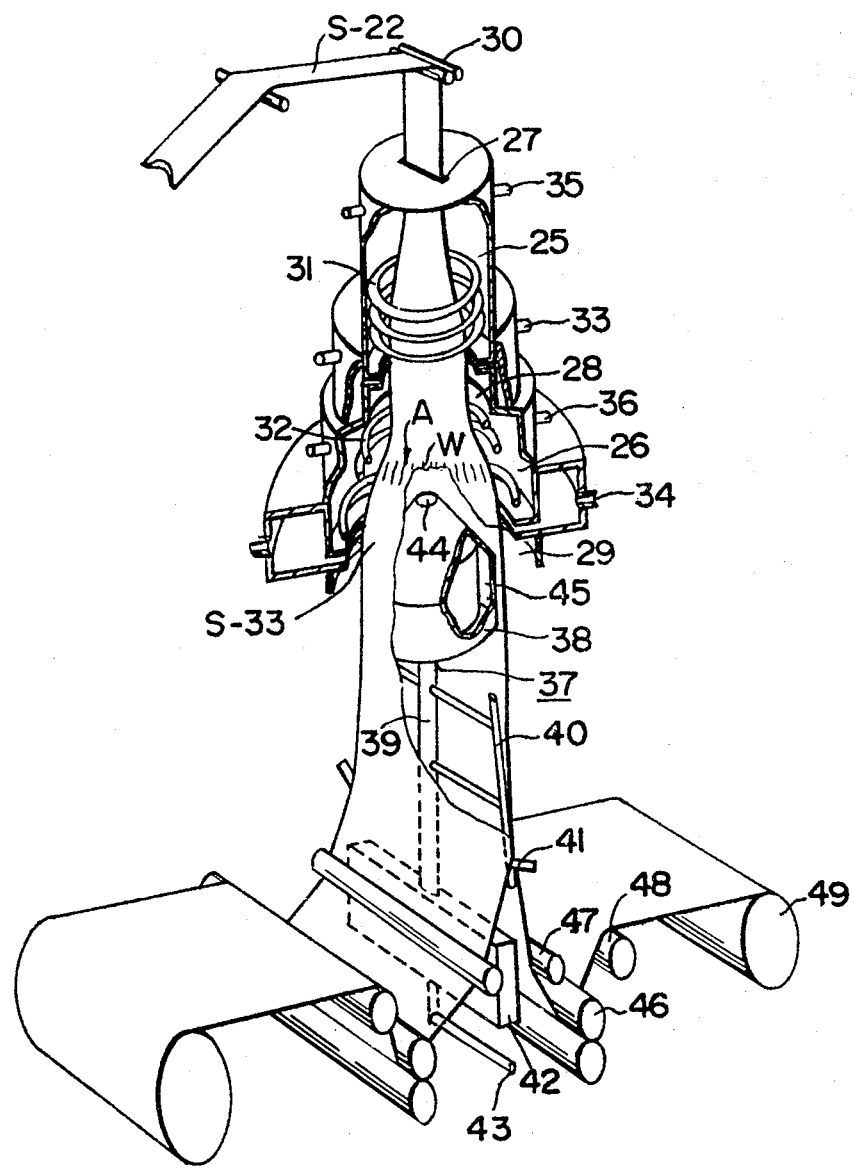

In FIG. 6, the reference numeral 25 indicates a pre-heating chamber, and 26, a foaming chamber connected to the pre-heating chamber 25. Both the pre-heating chamber 25 and the foaming chamber 26 are constructed with heat-insulating walls. In the upper wall of the pre-heating chamber 25 is provided an aperture 27 for passage of a tubular sheet in a flattened form. Annular openings 28 and 29 for passage of the tubular sheet are provided on a boundary wall between the pre-heating chamber 25 and the foaming chamber 26 and on a lower wall of the foaming chamber 26. Above the aperture 27 of the pre-heating chamber 25 is provided a supporting device 30 for the flattened tubular sheet. This supporting device 30 consists of a pair of pinch rolls so that the sheet is transferred to the pre-heating chamber 25 while being supported by this pair of pinch rolls. The pre-heating chamber 25 includes three annular infrared heaters 31, and the foaming chamber 26 includes three annular infrared heaters 32. These heaters are provided at predetermined intervals and in a manner surrounding the tubular sheet. Hot air inlets 33 and 34 are provided respectively at the bottom parts of the pre-heating chamber 25 and the foaming chamber 26, and hot air outlets 35 and 36 are provided at the upper parts of the pre-heating chamber 25 and the foaming chamber 26, respectively. Hot air introduced into the pre-heating chamber 25 and the foaming chamber 26 from the hot air inlets 33 and 34 respectively rises along the surface of the tubular sheet, and is exhausted from the hot air outlets 35 and 36.

By partitioning the pre-heating chamber 25 from the foaming chamber 26 with a boundary wall, the temperature of the pre-heating chamber 25 and the foaming chamber 26 can be controlled independently.

An extending device for a tubular sheet is shown at 37, which consists of a mandrel 38 with a cylindrical portion having a diameter corresponding to a ratio of the widthwise expansion of the foamed tubular sheet, i.e., 680 mm, a gas-inlet pipe 39 piercing approximately through the center of the mandrel 38, a flattening device 40, a cutter 41, and a mandrel supporting means 42. The reference numeral 43 represents an inlet opening for the gas-inlet pipe 39, and 44, its outlet opening. A cooling jacket 45 is disposed inside the cylindrical portion of the mandrel 38. The reference numeral 46 indicates a take-up device consisting of a pair of pinch rolls, 47 and 48, guide rolls, and 49, a wind-up device.

The T-die in the apparatus shown in FIG. 1 is replaced with a circular die. A mixture consisting of 100 parts by weight of a powdered polyethylene (passable through a 10-mesh screen) having a melt index of 7.0 and a specific gravity of 0.920, 13 parts by weight of azodicarbonamide, 0.7 part by weight of zinc stearate and 0.3 part by weight of zinc oxide is put into an extruder after having removed air from the mixture by reducing the pressure within the vacuum hopper shown in FIG. 1 to a pressure 450 mmHg below the atmospheric pressure. The mixture is kneaded and melted at 130° C. and extruded into a tubular form by the inflation method to thereby form a tubular sheet S–11 having a thickness of 1.1 mm and a width in a flattened state of 330 mm. The sheet is subjected in the flattened state to the irradiation of accelerated electrons at both the top and bottom surfaces thereof by means of the apparatus shown in FIG. 2 to form a cross-linked tubular sheet S–22. The total dose is 2.4 Mrad.

The so obtained cross-linked polyethylene tubular sheet S–22 having a thickness of 1.1 mm and a width in the flattened state of 330 mm is passed through the supporting aperture 27 while being supported by the supporting device 30 consisting of a pair of pinch rolls rotating at a surface speed of one meter per minute, and is caused to fall vertically into the preheating chamber 25. The tubular sheet S–22 is heated to about 160° C. by the hot air and the infrared heaters 31, passed through the annular opening 28, and caused to fall vertically into the foaming chamber 26. A gas such as air to be sent from the inlet 43 to the outlet 44 of the gas-inlet pipe 39 is introduced into the tubular sheet S–22 at a pressure of about 10 mm aq. and the flattened tubular sheet S–22 is maintained in a tubular form. The tubular sheet S–22 is heated by the hot air to about 200° C., and the temperature of the tubular sheet S–22 in its widthwise direction is accurately controlled by the infrared heaters 32. When the heating is carried out in this way, the starting position of foaming of the tubular sheet S–22 is substantially set along the widthwise direction of the tubular sheet S–22 and does not fluctuate upwards or downwards. Thus, the tubular sheet S–22 is expanded rapidly and sharply to about 25 times three-dimensionally along the line A in its widthwise direction. Wavy wrinkles W occur at this time in the foamed tubular sheet S–33 owing to the rapid expansion in the widthwise direction. These widthwise wavy wrinkles are however removed completely, as the foamed tubular sheet S–33 is immediately stretched widthwise by a ratio corresponding to a ratio of widthwise expansion of the tubular sheet S–22 by the pressure of a gas such as air introduced into the tubular sheet S–22.

The foamed tubular sheet S–33 completely free from the wrinkles is put over the mandrel 38 and pulled downwards with a very thin layer of gas such as air between the inner surface of the foamed tubular sheet and the surface of the cylindrical portion of the mandrel 38. While passing the mandrel 38, the foamed tubular sheet S–33 is cooled. The foamed tubular sheet S–33 is then flattened by the flattening device 40, and both ends of the foamed tubular sheet are continuously cut in the longitudinal direction with the cutter 41 to thereby give two foamed sheets. The sheets are passed through a guide roll 47, taken up by a take-up device 46 consisting of a pair of pinch rolls rotating at a surface speed of 3.3 meters per minute, and wound up onto a wind-up device 49 via a guide roll 48.

Thus, the use of the pressure of a gas such as air and a mandrel results in an easy removal of wavy wrinkles of the foamed tubular sheet S–33 which have occurred in the widthwise direction. In addition, the widthwise size of the foamed tubular sheet S–33 is well regulated by the action of the mandrel. Since a part of a gas such as air introduced into about the center of the mandrel passes between the inner surface of the foamed tubular sheet S–33 and the surface of the cylindrical portion of the mandrel and spontaneously flows out into the outer atmosphere from between the longitudinally cut foamed sheets, the inside surface of the foamed tubular sheet S–33 does not directly come into contact with the surface of the mandrel, and therefore is not marred at all.

The so obtained two foamed sheets, 2.4 mm thick and 1,050 mm wide, have a uniform and fine cellular structure with a beautiful, smooth surface in which a ratio of expansion is about 25 and the cells have a diameter of about 0.2 mm. Also, the sheets have a uniform thickness and are free from wrinkles.

While the invention has been described in connection with the preferred embodiments, it will be obvious to those skilled in the art that various changes and modifications may be made without departing from the spirit and scope of the invention.

We claim:
1. An apparatus for the production of a foamed sheet of an ethylenic resin, said apparatus comprising means for supporting an unfoamed flat sheet; a heat-forming chamber below said supporting means for foaming the unfoamed sheet by heating, said heat-foaming chamber including a hot air inlet, a hot air outlet, radiator heat- ers, an inlet for the unfoamed flat sheet at the upper end thereof, and an outlet for the foamed flat sheet at the lower end thereof; an extending device below said heat-foaming chamber for extending the width of the foamed flat sheet, said extending device including two opposed suction means spaced apart from each other in the widthwise direction of the foamed sheet, each of said suction means including a pressure reducing chamber, a guide groove for receiving the foamed flat sheet having a bottom surface with a plurality of suction holes therein leading to said pressure reducing chamber, and a moving belt slidable in contact with said bottom surface in said guide groove; and a take-up device below said extending device for taking up the foamed flat sheet.

2. An apparatus according to claim 1 wherein said heat-foaming chamber is partitioned by a boundary wall defining upper and lower compartments in said heat-foaming chamber, said wall having a gap therein for passage of the unfoamed flat sheet from said upper compartment to said lower compartment, said upper compartment defining a pre-heating chamber and said lower compartment defining a foaming chamber.

3. An apparatus for the production of a foamed sheet of an ethylenic resin, said apparatus comprising means for supporting an unfoamed tubular sheet; a heat-foaming chamber below said supporting means for foaming the sheet by heating, said heat-foaming chamber including a hot air inlet, a hot air outlet, radiator heaters, an inlet for the unfoamed tubular sheet at the upper end thereof, and an outlet for the foamed tubular sheet at the lower end thereof; an extending device below said heat-foaming chamber for extending the width of the foamed tubular sheet, said extending device including a mandrel having a cylindrical portion, a gas-inlet pipe extending approximately through the center of said mandrel, flattening device for flattening the foamed tubular sheet, a cutter for cutting the foamed tubular sheet and mandrel supporting means; and a take-up device below said extending device for taking up the foamed flat sheets.

4. An apparatus according to claim 14 wherein said heat-foaming chamber is partitioned by a boundary wall defining upper and lower compartments in said heat-foaming chamber, said wall having an annular opening for passage of the unfoamed tubular sheet from said upper compartment to said lower compartment, said upper compartment defining a pre-heating chamber and said lower compartment defining a foaming chamber.

5. An apparatus according to claim 3 wherein said flattening device is disposed below said mandrel and said cutter is disposed below said flattening device to cut the flattened foamed tubular sheet.

* * * * *

UNITED STATES PATENT OFFICE
CERTIFICATE OF CORRECTION

Patent No.  3,762,845          Dated   October 2, 1973

Inventor(s)  Norio SAGANE ET AL

It is certified that error appears in the above-identified patent and that said Letters Patent are hereby corrected as shown below:

Column 12, line 64 thereof: delete "heat-forming" and substitute --heat-foaming--

Column 14, line 14 thereof: delete "14" and substitute --3--

Signed and sealed this 19th day of February 1974.

(SEAL)
Attest:

EDWARD M. FLETCHER, JR.          C. MARSHALL DANN
Attesting Officer                Commissioner of Patents